United States Patent [19]

Gueneau et al.

[11] Patent Number: 5,319,883
[45] Date of Patent: Jun. 14, 1994

[54] SEALING DEVICE FOR WINDOW FRAME WITH SLIDING OR FIXED PANE

[75] Inventors: Patrick Gueneau, Saint-Remy-Les-Chevreuse; Bernard Massie, Levallois-Perret; Henri Guillon, Le Boios Saint Maurice Sur Fessart, all of France

[73] Assignee: Hutchinson, Paris, France

[21] Appl. No.: 803,014

[22] Filed: Dec. 5, 1991

[30] Foreign Application Priority Data

Dec. 7, 1990 [FR] France .................. 90 15338

[51] Int. Cl.⁵ ............................... E06B 7/16
[52] U.S. Cl. ................... 49/489.1; 49/441; 49/475.1
[58] Field of Search ........... 49/475, 479, 490, 489, 49/495, 491, 488, 440, 441

[56] References Cited

U.S. PATENT DOCUMENTS

| | | | |
|---|---|---|---|
| 4,604,830 | 8/1986 | Maeda | 49/440 X |
| 4,608,779 | 9/1986 | Maeda et al. | 49/440 X |
| 4,656,784 | 4/1987 | Brachmann | 49/441 X |
| 4,843,763 | 7/1989 | Mesnel | 49/490.1 X |
| 4,956,941 | 9/1990 | Vaughan | 49/490.1 X |
| 4,969,295 | 11/1990 | Nishikawa et al. | 49/441 X |
| 5,016,394 | 5/1991 | Iida et al. | 49/489.1 X |
| 5,038,521 | 8/1991 | Andielejewski et al. | 49/441 |
| 5,054,241 | 10/1991 | Mishima et al. | 49/490.1 |

FOREIGN PATENT DOCUMENTS

| | | |
|---|---|---|
| 308377 | 3/1989 | European Pat. Off. . |
| 378419 | 7/1990 | European Pat. Off. . |
| 380399 | 8/1990 | European Pat. Off. ........ 49/479 |
| 384851 | 8/1990 | European Pat. Off. ........ 49/441 |
| 1237217 | 9/1989 | Japan ........................ 49/490.1 |
| 1244920 | 9/1989 | Japan ........................ 49/490.1 |
| 227323 | 9/1990 | Japan ........................ 49/441 |
| 2216936 | 10/1989 | United Kingdom . |

Primary Examiner—Peter M. Cuomo
Assistant Examiner—Jerry Redman
Attorney, Agent, or Firm—Bell, Seltzer, Park & Gibson

[57] ABSTRACT

A sealing device for the frame of a bay provided in a door panel with the bay having a rabbet and being adapted to be closed by a window. The sealing device includes a first part for fastening on the rabbet having sealing lips designed to contact the window, a second part being connected to the first part by a third part which is sufficiently resilient and compliant to enable relative movement of the two first parts and the attachment by a locking action of said second part to an anchoring edge of the door panel.

2 Claims, 5 Drawing Sheets

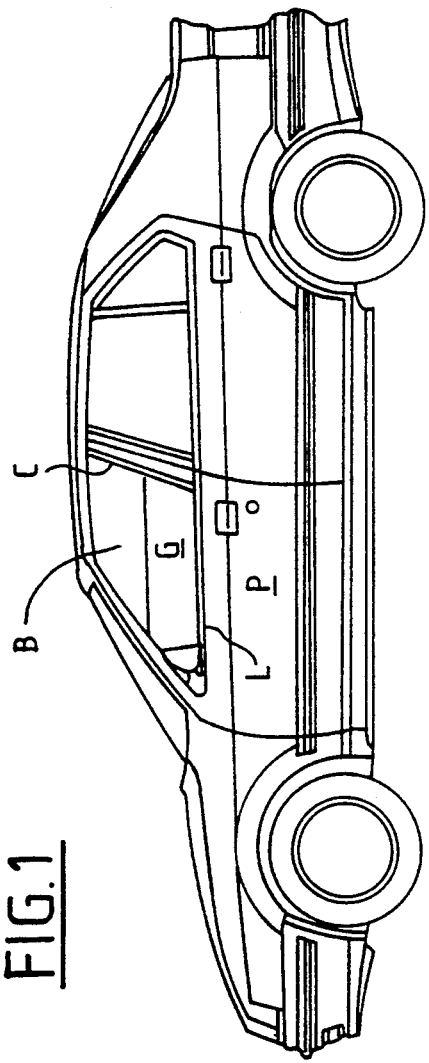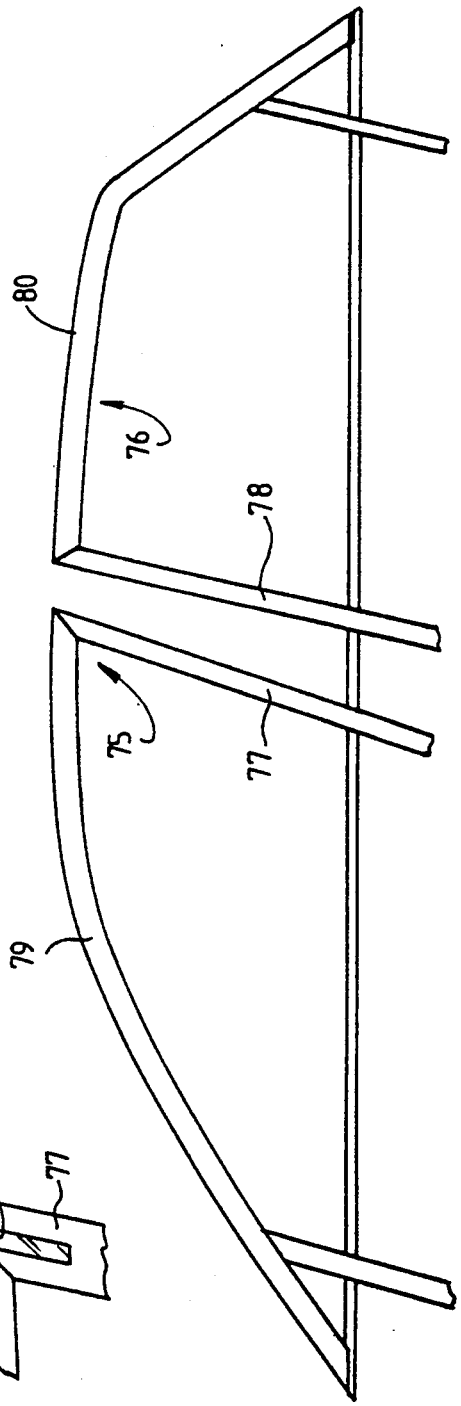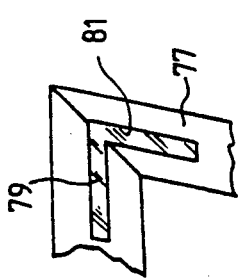

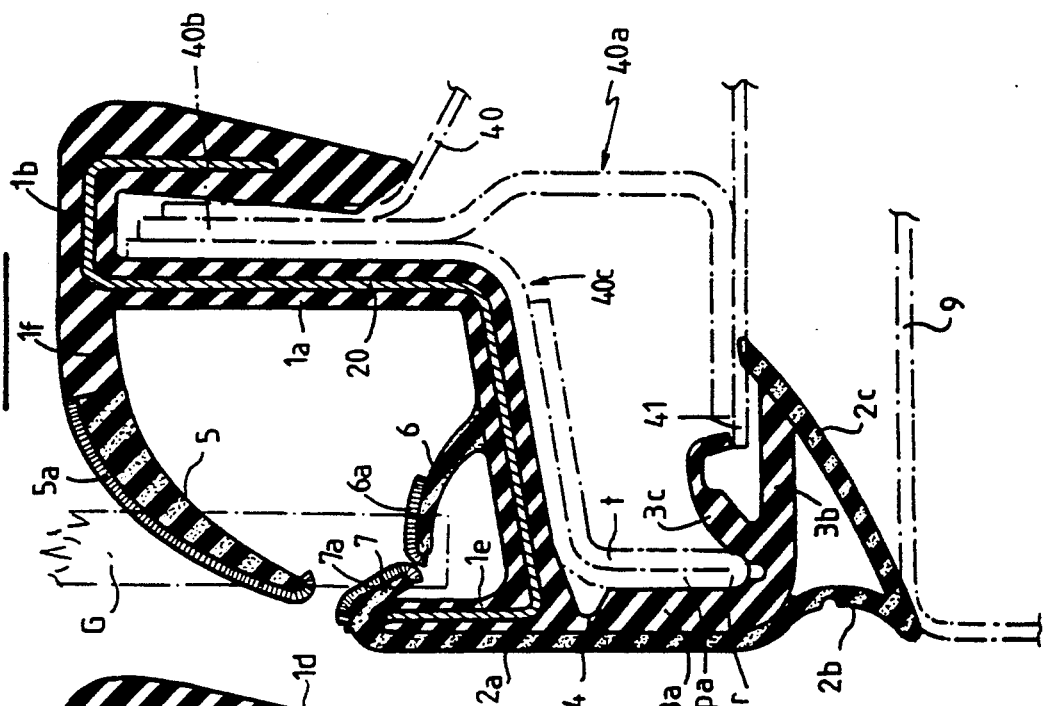
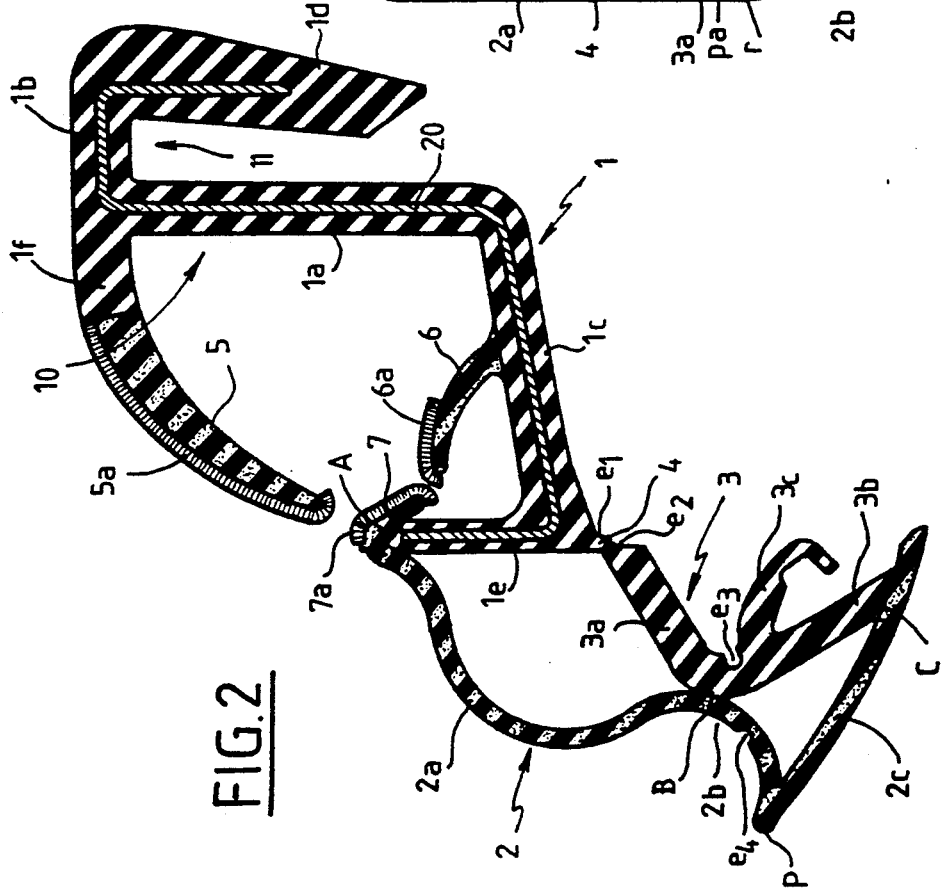

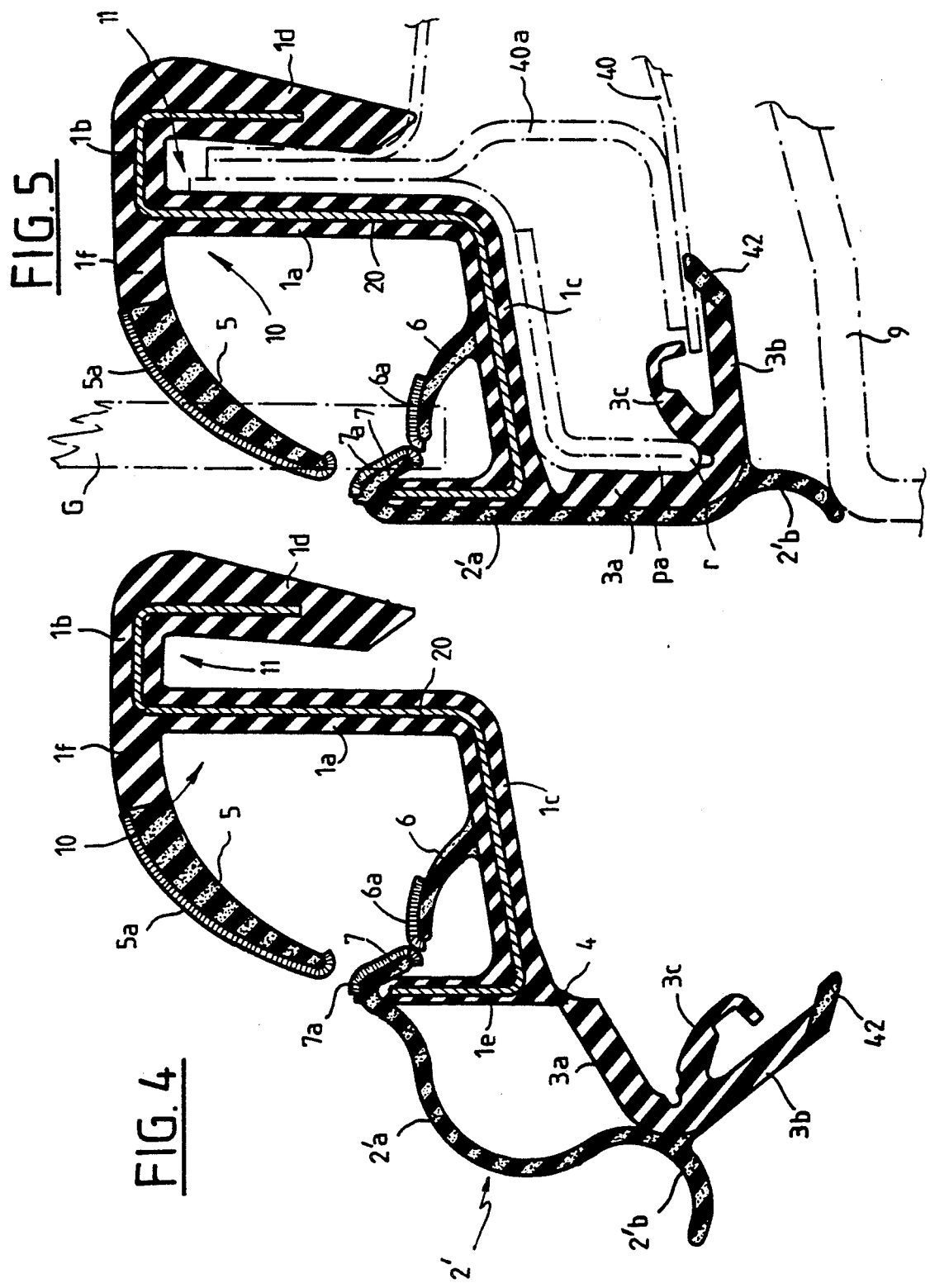

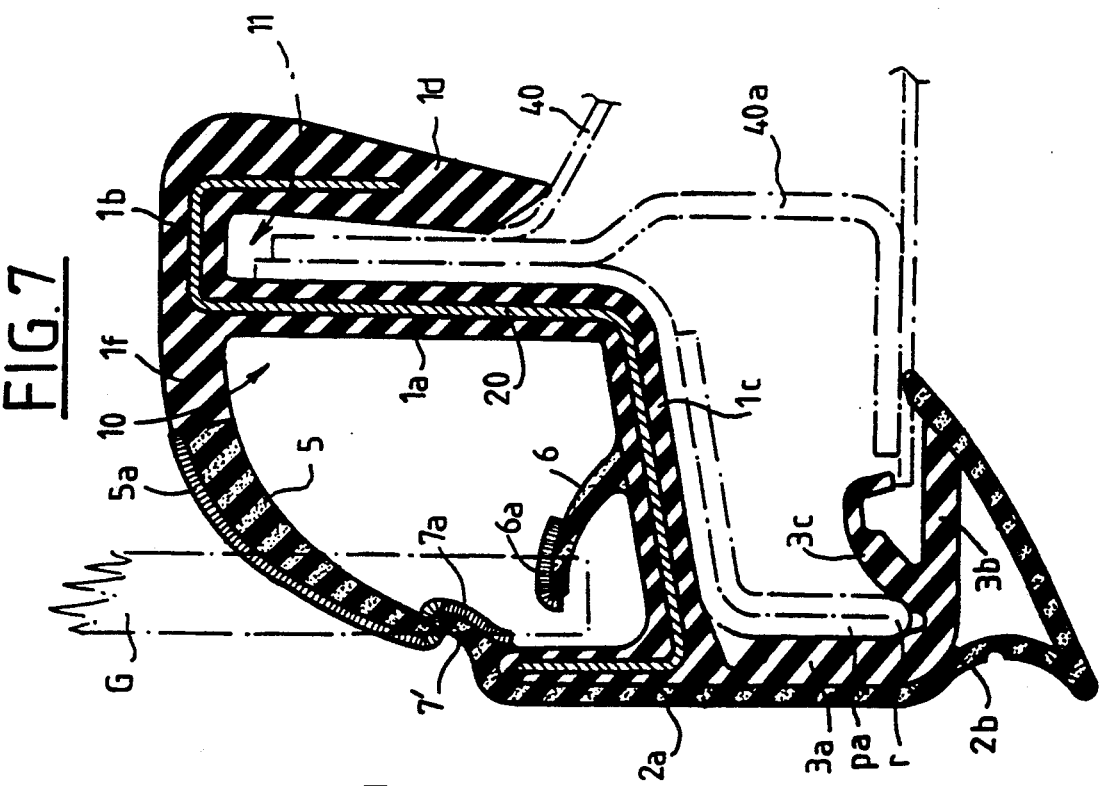
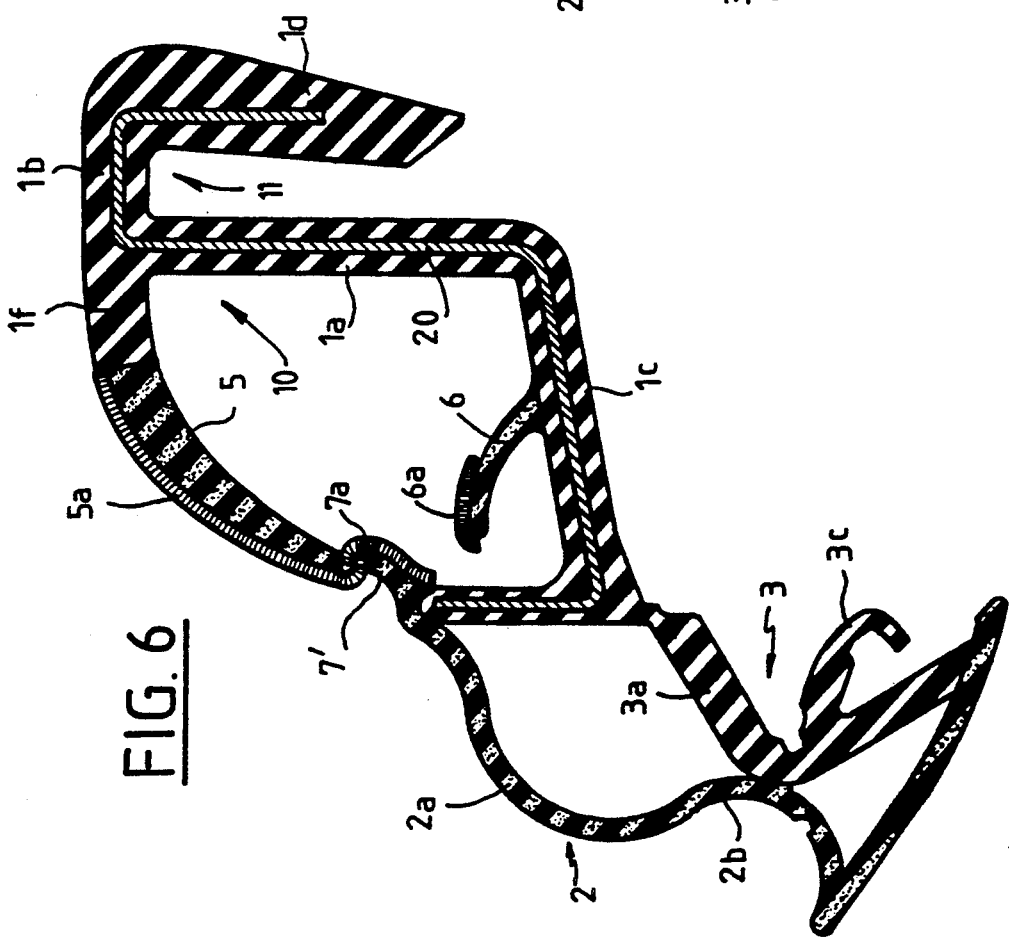

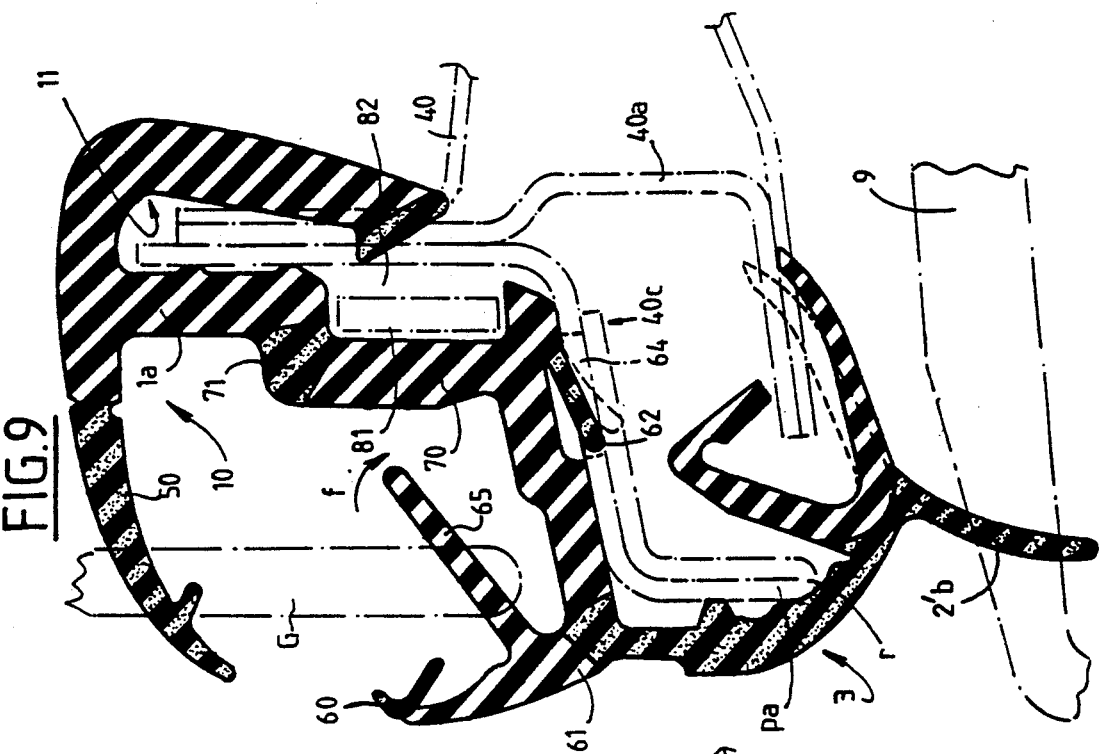
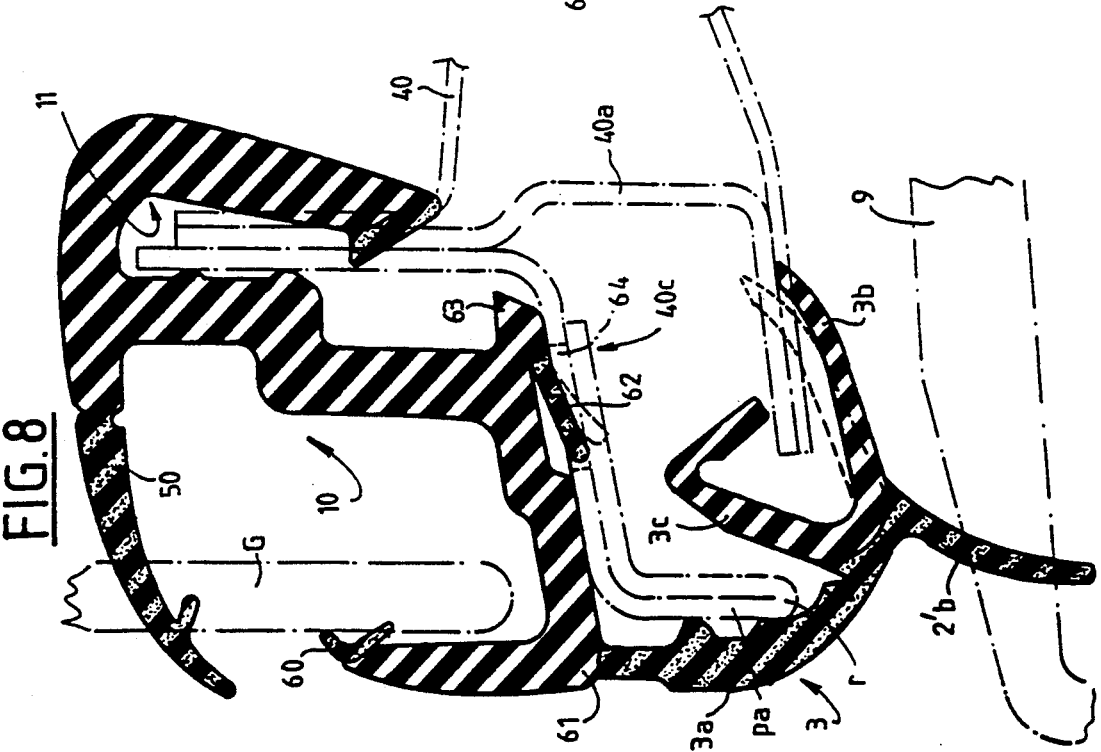

SEALING DEVICE FOR WINDOW FRAME WITH SLIDING OR FIXED PANE

FIELD OF THE INVENTION

This invention relates to a sealing device for a window frame with a fixed or mobile pane, particularly for automobile doors with sliding panes or windows.

BACKGROUND OF THE INVENTION

Such devices, generally referred to as vertical or horizontal slides when mounted on automobile doors with fixed panes, usually consist of a standard section, with sealing lips of a relatively flexible elastomer or plastomer, and a part of relatively hard elastomer or plastomer, approximately semicircular or U-shaped, which enables mounting or assembly of the slide on the metal plates of the door or the body of the door on which it is mounted. Many embodiments of such slides have already been proposed to solve the twofold problem raised by the need to trim the door frame, while guaranteeing the sealing of the two faces of the mobile window pane's surface at its junction with said frame in which it is mounted without hindering its sliding, both for automobile windows and panes of the usual type, and of the flush-mounted or approximately flush-mounted type, as described in EP-0-308 377 or DE-3512973. In certain known embodiments, the slides are in two parts, so that, added to the drawbacks associated with the cost of management of a large number of spare parts, are those of the behavior and appearance after mounting, as well as those incurred by sealing defects, such as noise and/or the deterioration of exposed parts, owing to the difficulty of achieving a satisfactory junction of the two parts of the slide. Furthermore, the mounting of the known slides on the rabbet of the bay on which they are mounted is often relatively complex, and tends to prevent the esthetically pleasing appearance provided by the trim, typically black, extending about the periphery of the window bay and generally referred to as "styling black" or "noir de style".

SUMMARY OF THE INVENTION

It is generally an aim of the invention to provide a sealing device for a bay frame for a mobile or fixed pane, particularly for a door frame of an automotive vehicle with a sliding pane, which does not present the drawbacks of the known devices.

It is also an aim of the invention to provide such a device for vehicle doors with flush-mounted, or approximately flush-mounted windows or panes which, while performing the basic functions of double sealing, also contributes to the esthetic aspect required for vehicles comprising this type of window.

It is a further aim of the invention to provide such a device capable of being mounted on different doors currently used in the automobile industry, particularly those comprising a stamped panel rigidified by a profiled element and clad with an outer skin crimped to the panel.

It is a further aim of the invention to provide such a device capable of being easily mounted on the entire rabbet of an automobile door which is to be provided with a slide, irrespective of the shape of the frame of said door.

A sealing device for a bay frame for a mobile or fixed window or pane, particularly for a door of an automotive vehicle, of the type comprising a first part for fixing and mounting on the rabbet of the bay and capable of being partly or totally closed by the said window or pane, and having sealing lips designed to come into contact with the window or pane, as well as a second part connected to the first part by a sufficiently resilient and compliant zone to enable their relative motion and the attachment and locking of said second part on an anchoring edge of the body or door of the vehicle.

An embodiment thus combines in a single profiled assembly a slide proper, with at least two sealing lips for a fixed or sliding window, and a sealing component forming an aerodynamic seal for the assembly zone of the frame to the door panel which, complementarily, contributes to giving the door frame an esthetically pleasing appearance with generally black trim about the window bay's periphery and generally referred to as "styling black" or "noir de style".

In one embodiment, said second part has the approximate shape of an angle section and comprises a hook or finger in its inside corner to improve the fastening or said second part to the door frame, the device, after mounting, being solidly fixed to the door frame by a double mechanical lock.

To perfect this solid attachment, the invention provides, in one embodiment, a flexible lip, for association with the outer face of the bottom of the actual slide, capable of cooperating with an oblong hole in a plate forming a slide holder.

According to another characteristic of the invention, the device is bent, and, as required, curved to give it, after mounting, the actual shape of the frame on which it is mounted.

As a variant, the device, which is generally made of elastomer and/or plastomer of different hardness, comprises, in the junction zone of an arm of the U-shaped mounting "clamp" and a wing of the actual slide, a cord of elastomer or plastomer of lower hardness than the rest of the device, and which enables the device to match the contour of the door frame, irrespective of the spatial shape of the device.

In a preferred embodiment, the device is made of a single piece with one vertical strand and either one horizontal/front strand of a front door slide or one horizontal/back strand of a back door slide, the vertical strand being connected to the rest of the device by a miter coupling rigidified on the inner face of the device by an angle section insert on which one of the component materials of the device is then duplicate-molded.

In an embodiment, a flexible skirt, integral with and outside of said second part approximately at the level of the corner of the angle section, is capable of masking the outer surface of said first and second parts after the device is mounted on the bay for which it is intended.

In a mode of execution, said skirt is prolonged, on the side opposite the side attached to said first part and beyond the top of the angle section where it is integral with said second part, by a short tab which bears, in its operating condition, on the body of the vehicle or on the door on which the device is mounted.

In a variant of execution, said skirt is prolonged beyond the top of the angle section by a profile forming a dihedron of which the end of the branch not attached to the angle section is integral with the wing of the angle section not connected to said first part.

In a preferred embodiment, said first part has a cross-section approximately in the form of an S for mounting and facing the device to the door rabbet, of which the median web bounds a gutter forming the actual slide which comprises the sealing lips for the mobile window or pane.

The lips which ensure the sealing on the two faces of the mobile window or pane or made of a compliant material and, in their operating zone, are provided with a flock or, preferably, lined with a material with good sliding properties such as a polyolefin, polytetrafluoroethylene or the like.

In an advantageous embodiment in which the lips are thus coated with a material with good sliding properties, the material is also added to the entire device, which, on the one hand, facilitates its mounting in the plates of the door panel and, on the other, confers a particularly pleasant overall appearance.

Irrespective of the embodiment, the invention may possibly, but not necessarily, provide for at least the first part of the device to be made mechanically stronger by a metal armature of steel or aluminum sunk in the elastomer and/or plastomer forming the fastening clamp on the rabbet and the actual slide while the sealing lips and said second part are devoid of an armature.

BRIEF DESCRIPTION OF THE DRAWINGS

The invention can be better understood and other characteristics will appear on a reading of the following description which refers to the drawings in which:

FIG. 1 is an elevation view of an automobile,

FIG. 2 is a transverse sectional view of a first device embodying the invention before mounting on the rabbet of a bay for which the device is intended, FIG. 3 is similar view to that of FIG. 2, but after the device has been mounted, FIG. 4 is a transverse sectional view of a second device embodying the invention before mounting, FIG. 5 is a similar view to that of FIG. 4, but after mounting, FIG. 6 is a transverse sectional view of a third device embodying the invention before mounting, FIG. 7 is a similar view to that of FIG. 6, but after mounting, FIG. 8 is similar view to that of FIGS. 3, 5, and 7 for another embodiment of a device embodying the invention, FIG. 9 is a similar view to that of FIG. 8 for another preferred embodiment, FIG. 10 is a schematic view of the doors of an automobile fitted with devices according to the invention, and FIG. 11 is a schematic view on a larger scale of one corner of a device mounted on FIG. 10.

DESCRIPTION OF THE PREFERRED EMBODIMENTS

Referring to FIG. 1, an automobile of which a door P displays a bay B which can be closed by a window or pane G shown in the semi-lowered position is illustrated. The sealing of the lower edge of the bay against rain, sand, dust and generally the introduction of any solid, liquid or gaseous element or particle, as well as sound waves, is ensured by at least one wiper L, whereas the sealing of the upper edge and of the side edges is ensured, simultaneously with the guiding of the window or pane G, by slides C fixed to the rabbet of the bay of door P. In many known embodiments, the wiper and the slides are mounted on and made integral with the rabbet by a "clamp", i.e. a part of a relatively hard material with a cross-section of substantially semicircular or U-shape which is emplaced by forced insertion on the rabbet. The window seal also includes an auxiliary seal which is subsequently added. The mounting of the wiper, slides and auxiliary seal is costly in terms of time and money and, since the connection of the slide to the auxiliary seal is never perfect, such seals are typically noisy, seal improperly and have an unattractive appearance.

To overcome these drawbacks, a sealing device embodying the invention for a bay frame for a sliding or fixed pane combines, in a single unit, both the means for sealing the two faces of the window or pane G and the means for producing a finished aerodynamic seal, while simultaneously being simple and safe to assemble. The device also complementarily provides the desired esthetic appearance of window trim, typically black, on the outer face of the door.

An initial embodiment is shown in FIGS. 2 and 3 in an unstressed condition prior to mounting and in the mounted condition on the rabbet of the bay of the door, respectively. The device comprises a relatively hard and rigid first part 1, of elastomer or plastomer, which comprises the slide 10 proper and of which the cross-section is approximately that of an S. The first part typically incorporates a metal armature 20, cut out of aluminum or steel, which serves to give the slide the bend and curve necessary to match the peripheral shape of the bay. As clearly shown in FIG. 2, the web 1a of the part 1 forms with a wing 1d connected to the web 1a by an am 1b, a clamp 11 for mounting and maintaining the device on the rabbet of the door P, made in the example described and shown as a die-stamped door panel 40 to which a standard section 40a is welded to make it rigid. The resulting combination of the door panel 40 and the standard section 40a is then clad with an outer skin. The clamp also cooperates by elastically tightening about the branch 40b of slide holder 40c which has a stepped cross-section and which is fixed to the door panel and/or the rigidification profile by welding or weld-brazing (FIG. 3). Besides clamp 11 defined above, the first part 1 also comprises the actual slide 10 limited by a web 1a, a wing 1e which is approximately parallel to but shorter than web 1a, and a wing 1c connecting the two parallel wings together to make a U-section in which the mobile glass or pane G is partly lodged, as shown by a dashed line in FIG. 3.

Three lips of elastomer or plastomer, which are relatively resilient in comparison with the material making up the clamp which is, for example of a hardness of about 48 to 50 Shore D, are associated with the actual slide 10. The three lips, more precisely, comprise a lip 5 connected at the end of web 1a to the junction of web 1a with arm 1b, a lip 6 connected approximately in the median zone of arm 1c, directed towards the lip 5 and towards the wing 1e of part 1, and a lip 7 supported by the end of the wing 1e and directed towards the lip 6. Linings 5a, 6a and 7a are deposited on the parts of the lips intended to come into contact with the window or pane G to improve the sliding thereof. These linings may be provided in the form of flock, as suggested by their cross-hatched representation or, preferably, can consist of layer of material with good sliding properties such as a polyolefin or polytetrafluoroethylene, which is then deposited on the entire device, both give it a pleasant appearance and to assist in the mounting of the device on the door frame as described below.

Associated with the part 1 thus defined is a second part 3 of the same material of the relatively hard plastomer or elastomer type of which part 1 is formed. Parts 1 and 3 are connected by a thin zone 4 to form a hinge. The second part 3 has the general shape of an angle section formed with two arms 3a, 3b and a hooking finger 3c in the inner corner of the angle section.

Also, associated with the structure described above is a skirt 2 designed to mask the wing 1e and the arm 3e after mounting the device on the bay rabbet for which it is intended. As clearly shown in FIGS. 2 and 3, the skirt 2, formed of a the elastomer or plastomer material, either solid or cellular, similar to that of the sealing lips 5, 6 and 7, extends from outside of the actual slide 10 from a zone A of wing 1e, where it merges with lip 7, to a zone C at the end of the arm 3b. The skirt 2 forms a single piece with lip 7, on the one hand, and is also integral with the second part 3 of the device in a zone B on the outer surface of the corner of the angle section formed by the two arms 3a, 3b of said part 3. Between the contact zones A and B, the skin 2 is outwardly curved away from angle section 3 and the actual slide 10. Between the contact zones B and C, a part 2b is inwardly curved in the opposite direction to part 2a lying between the zones A and B, thus forming a backturned line p resembling an edge of a dihedron of which the faces consist of the parts 2b and 2c located between zone B and zone C. Recess lines e1, e2, e3 at the junction of parts 1 and 3 on the one hand, and of hook or finger 3c with arm 3a on the other, as well as a recess line e4 at the top of the arch made by skirt 2 between zone B and line p, form thin areas in the thickness of the material of the device, which contribute to the ease of deformation of the corresponding parts for the installation of the device.

As shown in FIGS. 2 and 3, this installation takes place by first positioning clamp 11 on the end part of the plates of the door panel, the rigidification profile and the slide holder 40c, to ensure an initial mechanical locking of the device to the door frame. Angle section 3 is then folded around the hinge formed by zone 4 to bring the said angle section into the position shown in FIG. 3, in which the top of the angle section overlaps the folded edge r of a facing pa approximately parallel to the plane of the window or pane G (i.e. substantially parallel to the part 40b of the slide holder 40c) and in which the hook or finger 3c is locked to a shoulder 41 provided near the outer end of the junction of the door panel 40 and a wing of the rigidification profile 40a, and directed approximately perpendicular to the facing pa. The skirt 2 is applied against the arm 3a and the wing 1e which conceals any waviness appearing during the extrusion of the device with armature 20, while the backturned line p is in contact with a part 9 of the door. Parts 2 and 3 of the device thus perform a dual function of sealing the door frame and creating an esthetic appearance, by providing a continuous trim of the said frame concealing the welding or weld-brazing lines, while constituting an esthetically pleasing rim, generally referred to as a "styling black" ("noir de style") border on the outer face of the bay.

The mode of execution illustrated in FIGS. 4 and 5 only differs from that shown in FIGS. 2 and 3 in the form of the skirt designed to abut against wing 1e and arm 3a to improve the aerodynamic seal made by part 3 of the device. In this embodiment, the skirt 2' connecting the wing 1e of the part 1 to the angle section 3, comprises, beyond its contact zone B with the top of the angle section, only one free part, 2b which, diverging from the angle section, forms an aerodynamic seal which abuts against the shaft 9 of the door after the device has been installed. In this mode of execution, furthermore, the hooking of the angle section formed by part 3 of the device on the folded edge r of the slide holder 40c furnishes a second mechanical locking of the device (the first being that obtained, in part by, clamp 11) for the simple and safe immobilization of the device on the bay for which it is intended. Complementarily, a short lip 42 of resilient elastic material provided at the end of arm 3b of the angle section performs a function of mechanical and acoustic damping which was provided by the end of the face 2c in the neighborhood of the zone C in the mode of execution in FIGS. 2 and 3.

The mode of execution shown in FIGS. 6 and 7 only differs from the one shown in FIGS. 2 and 3 in the orientation of the lip 7 (similar to lip 7 in the previous embodiments) which is directed towards the lip 6 with which it is in contact in the absence of a window or pane.

Let us now refer to FIG. 8 relative to an initial preferred embodiment. In this figure, the device is made by co-extrusion of elastomer and/or plastomer materials of different hardness and comprises, as in the embodiments described above, a clamp 11, a slide proper 10 and lips 50 and 60 (the latter having an L-shaped cross-section) capable of cooperating with the two faces of a window or pane G to ensure its sealing on the one hand, and, on the other, to form an anti-vibration means. Associated with the clamp 11 and the slide proper 10, which may or may not be provided with a metal armature, as in the embodiments described above, is a part 3 with an approximately square cross-section, with a hook or finger similar to finger 3c of the previous embodiments. Whereas the finger 3c and the arm 3b are of relatively hard elastomer or plastomer, the arm 3a (which is connected to the outer angle 61 of the slide proper), in contrast to the prior embodiments, is of a relatively compliant material, as shown by the crosshatching and dashes in the figure. As clearly visible in this figure, a part 2b of part 3, also of a compliant material, operates similar to part 2'b in FIGS. 4 and 5, while a lip 62, also of compliant material, which projects from the inner corner 63 of the slide proper 10, is capable of cooperating with an oblong hole 64 of the slide holder 40c.

In a variant, associated with the outer face of the bottom of the slide proper 10 is a flexible lip 62 capable of cooperating with a hooking or retaining system 64 and a plate forming a slide holder 40c.

The hooking and retaining system 64 may consist of a longitudinal groove.

The hooking and retaining system 64 may consist of a longitudinal protuberance.

The equally preferred embodiment shown in FIG. 9 comprises a clamp 11 and a part 3 identical to those of the embodiment as in FIG. 8. In this embodiment, however, the outer angle 61 of the slide proper 10 is lined internally with a hook or finger 65 which, when it is caused to pivot in the direction of the arrow F by contact with the mobile window G, brings sealing lip 60 in contact with the outer face of said window.

In this embodiment which, like the one in FIG. 8, may or may not be provided with a metal armature, the invention complementarily provides for the web 1a of said clamp 11 to be connected with wing 70 of the slide proper with which it is not coplanar by a cord 71 of flexible material, such as, for example, that material making up the lips 50, 60 and part 3. The presence of this cord of flexible and hence easily deformable material enables the device to match, as required, the curved and bent shape of the door frame, without any need to make the overall device conform at the discharge end of the extrusion die. This matching considerably reduces the cost of fabrication of the device on the one hand, and facilitates its mounting on the door frame on the other, irrespective of the shape of the door frame. As pointed out above, the overall device is lined with a layer of material with good sliding properties, such as polyolefin or polytetrafluoroethylene, with the cord 71 allowing the release of any stresses occurring during the installation of the device on frames of relatively complex shape.

FIGS. 10 and 11 show two devices embodying the invention, 75 and 76, associated with the front and back doors of an automotive vehicle with each device comprising a vertical strand 77 or 78 associated by a miter cut with the horizontal/front strand 79 and with the horizontal/back strand 80 respectively. As shown schematically in FIG. 11, the strands 77, 79, and 78, 80 are joined together by a metal angle section 81, advantageously placed in the volume, such as volume 82 in FIG. 9, made by the disalignment of the web 1a and of the wing 70. The angle section is then coated in a duplicate molding of the same material as the one making up the relatively rigid parts of the device. The vertical strands 77 and 78 of the devices 75 and 76 are of a single piece and can be cut opposite the door shaft such that their ends penetrate inside the door panel.

The sliding device is advantageously made by extrusion or co-extrusion of the different component materials, either directly in the shape shown in FIGS. 2, 4 and 6, which is that preceding the mounting, or in a deployed profile, which is then adjusted to make the clamp, the slide proper and other associated parts. This adjustment may be followed by a curving and bending to adjust the form of the device to match that of the frame of the bay for which it is intended.

The invention is obviously not limited to the embodiments described and/or shown, nor to its application to slides of automobile windows, but it applies to any slide for a mobile surface, vertically or not, especially to any window or pane of any vehicle other than an automobile, including railway cars and ships.

The various materials may be selected from very wide ranges, the choice being made in particular in accordance with the conditions of use of the device or according to the type and/or shape of the window or pane G with respect to the sliding coatings of the sealing lips.

What is claimed is:

1. A sealing device for a frame of a bay provided in a door panel, said bay having a rabbet and said bay being adapted to be closed by a window, said device comprising:
   a first part for fastening and mounting on said rabbet and having sealing lips designed to contact said window;
   a second part connected to said first part and forming a seal for an assembly zone of the bay to the door panel, said second part including an angle section and a finger in an inner corner of said angle section to enhance the hooking of said second part to the frame, whereby it is solidly fixed to the frame by a double mechanical lock after assembly thereof;
   a third part for joining said first and second parts and said third part being sufficiently resilient and compliant to enable relative movement of the first and second parts and to enable attachment of said sealing device by a locking action of said second part to an anchoring edge of the door panel; and
   a flexible skirt integral with said second part, outside of said angle section and adapted to hide an outer surface of said first and second parts when the device is mounted on the bay for which the device is intended, wherein said skirt is extended beyond an apex of the angle section by a profiled section forming a dihedron of which an end of a branch which is not connected to the angle section is integral with a wing of the angle section not connected to said first part.

2. A sealing device made as a single profiled unit for a frame of a bay provided in a door panel, said bay having a rabbet and said bay being adapted to be closed by a window, said device comprising:
   a first part for fastening and mounting on said rabbet and having sealing lips designed to contact said window, said first part being shaped as a slide proper with at least two sealing lips for the window, said slide proper having a bottom surface which has an outer face for association with a flexible lip and for cooperating with an oblong hole defined in a plate forming a slide holder;
   a second part connected to said first part and forming a seal for an assembly zone of the bay to the door panel, said second part forming an aerodynamic seal for the assembly zone of the frame to the door panel; and
   a third part joining said first and second parts and said third part being sufficiently resilient and compliant to enable relative movement of the first and second parts and to enable attachment of said sealing device by a locking action of said second part to an anchoring edge of the door panel.

* * * * *